(12) United States Patent
Yue

(10) Patent No.: US 9,079,652 B2
(45) Date of Patent: Jul. 14, 2015

(54) DROOP PANEL LINKAGE

(75) Inventor: Haikou Yue, Beijing (CN)

(73) Assignee: AIRBUS S.A.S., Blagnac Cedex (FR)

( * ) Notice: Subject to any disclaimer, the term of this patent is extended or adjusted under 35 U.S.C. 154(b) by 164 days.

(21) Appl. No.: 13/699,025

(22) PCT Filed: May 21, 2010

(86) PCT No.: PCT/CN2010/000729
§ 371 (c)(1),
(2), (4) Date: Jan. 24, 2013

(87) PCT Pub. No.: WO2011/143794
PCT Pub. Date: Nov. 24, 2011

(65) Prior Publication Data
US 2013/0112814 A1    May 9, 2013

(51) Int. Cl.
| | |
|---|---|
| *B64C 3/38* | (2006.01) |
| *B64C 9/04* | (2006.01) |
| *B64C 9/16* | (2006.01) |
| *B64C 9/32* | (2006.01) |
| B64C 9/14 | (2006.01) |

(52) U.S. Cl.
CPC ... *B64C 9/04* (2013.01); *B64C 9/16* (2013.01); *B64C 9/32* (2013.01); *B64C 2009/143* (2013.01); *Y02T 50/44* (2013.01)

(58) Field of Classification Search
USPC ............. 244/211–219, 99.2, 99.3, 99.4, 75.1; 74/96, 521, 106; 403/150
See application file for complete search history.

(56) References Cited

U.S. PATENT DOCUMENTS

| | | | | |
|---|---|---|---|---|
| 2,620,147 | A | * 12/1952 | Cook, Jr. et al. | 244/216 |
| 3,030,052 | A | * 4/1962 | Grudin | 244/99.2 |
| 3,912,202 | A | * 10/1975 | Jenkins | 244/52 |
| 4,049,219 | A | * 9/1977 | Dean et al. | 244/217 |
| 4,498,647 | A | * 2/1985 | Boehringer et al. | 244/99.3 |
| 4,605,187 | A | * 8/1986 | Stephenson | 244/216 |
| 4,702,442 | A | * 10/1987 | Weiland et al. | 244/216 |
| 4,705,236 | A | * 11/1987 | Rudolph | 244/90 R |
| 4,784,355 | A | * 11/1988 | Brine | 244/213 |
| 6,457,674 | B2 | * 10/2002 | Erben et al. | 244/129.5 |
| 6,464,176 | B2 | * 10/2002 | Uchida et al. | 244/216 |
| 6,530,544 | B2 | * 3/2003 | Milliere | 244/213 |
| 8,181,908 | B2 | * 5/2012 | Mauran et al. | 244/99.4 |
| 8,276,842 | B2 | * 10/2012 | Kracke | 244/99.4 |
| 8,408,499 | B2 | * 4/2013 | Cerne | 244/213 |
| 2002/0047068 | A1 | * 4/2002 | Uchida et al. | 244/75 R |
| 2007/0034748 | A1 | * 2/2007 | Sakurai et al. | 244/215 |
| 2010/0032520 | A1 | * 2/2010 | Mauran et al. | 244/99.4 |
| 2010/0116928 | A1 | * 5/2010 | Cerne | 244/87 |
| 2010/0127120 | A1 | * 5/2010 | Coulter et al. | 244/99.2 |
| 2010/0163685 | A1 | * 7/2010 | Vormezeele et al. | 244/214 |
| 2011/0001015 | A1 | * 1/2011 | Kracke | 244/213 |
| 2011/0073712 | A1 | * 3/2011 | Andreani | 244/131 |
| 2011/0101174 | A1 | * 5/2011 | Voss et al. | 244/213 |
| 2012/0248257 | A1 | * 10/2012 | Eichhorn et al. | 244/214 |
| 2014/0061381 | A1 | * 3/2014 | Gyuricsko et al. | 244/99.3 |

FOREIGN PATENT DOCUMENTS

| | | |
|---|---|---|
| EP | 0075966 A2 | 4/1983 |
| WO | 2009019011 A2 | 2/2009 |

OTHER PUBLICATIONS

Search Report corresponding to PCT/CN2010/000729, dated Mar. 3, 2011.

* cited by examiner

*Primary Examiner* — Christopher P Ellis
*Assistant Examiner* — Medhat Badawi
(74) *Attorney, Agent, or Firm* — Lowe Hauptman & Ham, LLP

(57) ABSTRACT

A droop panel linkage for aircraft includes a lever arm, a main lever, a main tube and at least one drive strut. The lever arm is pivotally attached at a first end to a flap and is pivotally connected at a second end to a first end of the main lever. A second end of the main lever is provided with a first engagement element for engaging with a second engagement element incorporated into or associated with the main tube. The main tube is pivotally connected to a proximal end of the drive strut. A distal end of the drive strut is pivotally attached to the droop panel.

11 Claims, 4 Drawing Sheets

DROOP PANEL LINKAGE

RELATED APPLICATIONS

The present application is a national Phase of International Application Number PCT/CN2010/000729, filed May 21, 2010.

FIELD OF THE INVENTION

The present invention relates to a droop panel linkage for aircraft.

BACKGROUND OF THE INVENTION

A droop panel linkage is known in the prior art, via which the motion of a flap of aircraft is transferred to the droop panel. As shown in FIG. 2, the known droop panel linkage comprises a lever arm, a main lever, a main tube and drive struts. The lever arm is pivotally fixed at a first end to the flap and pivotally connected at a second end to a double-lever type of main lever. When the flap is deployed, it drives the lever arm and further drives the main lever. The double-lever type of main lever is configured to be forklike. Each lever arm of the main lever is provided with a spline hole for engaging with the outer spline teeth of an outboard tube and an inboard tube respectively, so that the motion of the main lever is transferred to the outboard tube and the inboard tube respectively. The other end of the outboard tube and the inboard tube is pivotally connected to the proximal end of a drive strut in the direction perpendicular to the axis of the inboard and outboard tube respectively. A distal end of the drive strut is pivotally attached to the droop panel. As a result, the movement of the flap is transferred via the lever arm, the main lever, the outboard tube and the inboard tube, ultimately to the droop panel. However, the disadvantage of the droop panel linkage in the prior art is in that the configuration of the known droop panel linkage, in particular the double-lever or compound type of main lever, results in a significant weight penalty for the required structure.

SUMMARY OF THE INVENTION

The present invention is based on the object of providing a lightweight, simple-structure droop panel linkage.

For achieving the above mentioned object, the droop panel linkage for aircraft according to an embodiment comprises a lever arm, a main lever, a main tube and at least one drive strut, said lever arm is pivotally attached at a first end to a flap and is pivotally connected at a second end to a first end of the main lever, wherein a second end of said main lever is provided with a first engagement means, in a preferred embodiment being a spline hole, for engaging with a second engagement means, such as spline teeth, incorporated into or associated with the main tube, said main tube is pivotally connected at its one end to a proximal end of the drive strut, wherein a distal end of the drive strut is pivotally attached to the droop panel. In a preferred embodiment, the main lever is configured as a single-lever type of main lever. The single-lever type of main lever is a main lever in the form of unitary structure having a single load path. As a result of this configuration, the total weight of the droop panel linkage is reduced and the weight penalty of the overall construction is mitigated.

The main lever and main tube engage mechanically by means of a suitable engagement means which will impart the displacement of the main lever into rotational movement of the main tube. In a preferred embodiment, the engagement means is a spline construction. However, other mechanisms are envisaged and are to be considered within the scope of the present invention.

In a preferred embodiment, the main tube consists of an outboard tube and an inboard tube, and the outboard tube has substantially the same configuration as the inboard tube. In a preferred embodiment, the outboard tube and the inboard tube respectively have at a first end the second engagement means, preferably outer spline teeth, for engaging with the first engagement means of the main lever, preferably inner spline teeth, wherein said outboard tube and said inboard tube respectively have at a second end a first attachment means for articulating with the drive strut, which is integrated into the outboard tube and the inboard tube respectively.

In a further embodiment, said first attachment means may be in the form of a lug which protrudes from the main tube in the radial direction thereof, and said lug is provided with a joint bore for receiving a joint pin.

Alternatively, the main tube may be configured as a single piece, wherein the second engagement means, preferably outer spline teeth, is arranged substantially at the centre of the main tube so as to engage with the first engagement means of the main lever, preferably inner spline teeth, wherein the main tube has at a first end a first attachment means for articulating with the drive strut, which is integrated with the main tube, wherein a second attachment means for articulating with the drive strut is detachably mounted on a second end of the main tube. In a further embodiment, the first attachment means may be in the form of a lug which protrudes from the main tube in the radial direction thereof, and the second attachment means may be in the form of a cam, and the cam and the lug have respectively a joint bore for receiving a joint pin.

It is of particular advantage that the second attachment means has an axial extension portion which can be inserted into an inner hollow cavity of the main tube, whereby an engagement means, for example outer spline teeth, of said axial extension portion engages with the corresponding engagement means, for example inner spline teeth, of the inner hollow cavity of the main tube. At the second end of the main tube, a stepped hollow part can be inserted into the inner hollow cavity of the main tube, and that the hollow part protrudes at its one end having smaller diameter from the central bore of the second attachment means, and the second attachment means can be fixed axially by means of a lock nut being screwed on the protruding portion of the hollow part.

BRIEF DESCRIPTION OF THE DRAWINGS

Embodiments of the invention will be explained in detail below with reference to the drawings, in which.

DETAILED DESCRIPTION OF THE DRAWINGS

Figure 1:
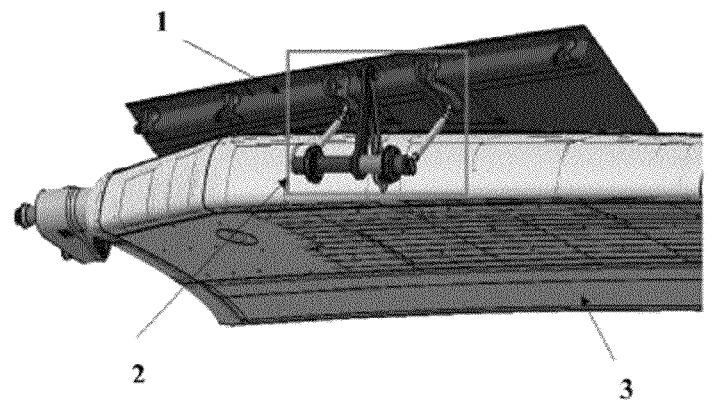
FIG. 1 shows a droop panel linkage which is mounted on the flap of an aircraft.
Figure 2:
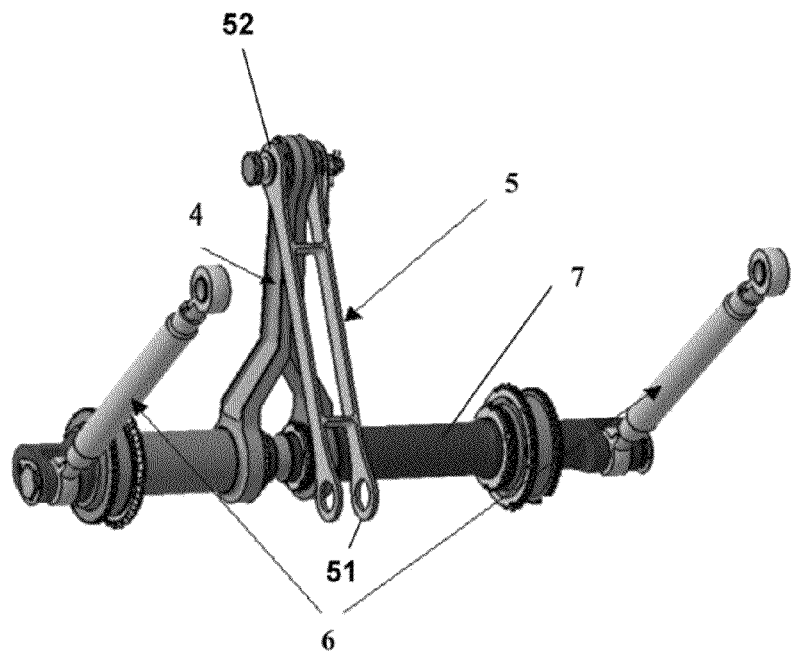
FIG. 2 shows a double-lever type of droop panel linkage in the prior art.

FIG. 1 shows a droop panel linkage 2 which is mounted on a flap 3 of an aircraft. The deployment and retraction motion of the flap 3 is transferred to the droop panel 1 by means of the droop panel linkage 2.

Figure 3:
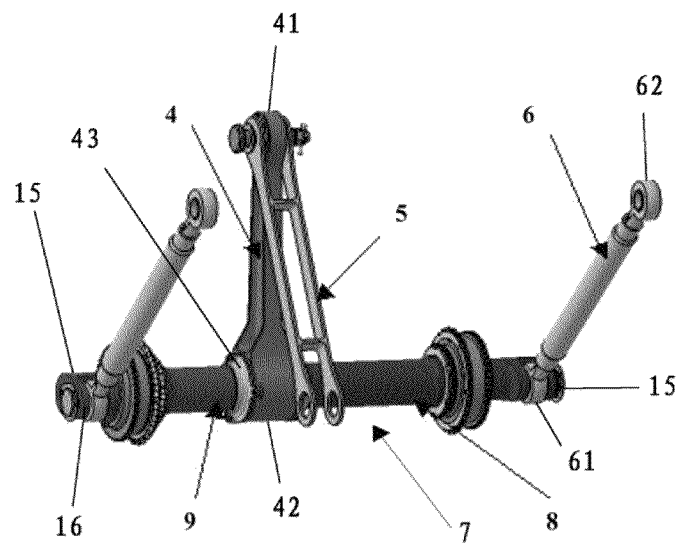
FIG. 3 shows a single-lever type of droop panel linkage.

FIG. 3 shows a single-lever type of droop panel linkage 2 for aircraft according to an embodiment of the disclosure. Said droop panel linkage 2 comprises a lever arm 5, a main lever 4, a main tube 7 and at least one drive strut 6, preferably two drive struts 6 as shown in FIG. 3, said lever arm 5 is pivotally attached at a first end 51 to a flap 3 and is pivotally connected at a second end 52 to a first end 41 of the main lever 4, wherein a second end 42 of said main lever 4 is provided with a first engagement means 43 for engaging with a second engagement means 73 incorporated into or associated with the main tube 7, said main tube 7 is pivotally connected at its one end to a proximal end 61 of the drive strut 6, wherein a distal end 62 of the drive strut 6 is pivotally attached to the droop panel 1.

The main lever 4 may be configured as a single-lever type of main lever, which may be in the form of a unitary, monolithic or single-structure having a single load path, thereby leading to advantageous weight characteristics in the droop panel mechanism as a whole.

Figure 4:
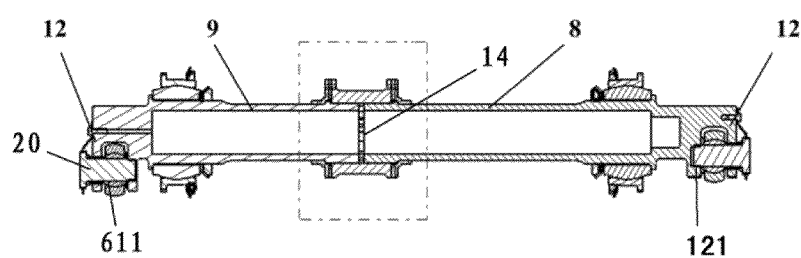
FIG. 4 shows a first embodiment of the main tube of the droop panel linkage.

FIG. 4 shows a first embodiment of the main tube 7 of the droop panel linkage 2 for aircraft. In the first embodiment as shown in FIG. 4, the main tube 7 is formed by two parts, i.e., an inboard tube 8 and an outboard tube 9. In FIG. 4, the outboard tube 9 at a first end 14 is provided with a second engagement means 73, in the form of outer spline teeth, which engages with a first engagement means 43, preferably in the form of inner spline teeth, of the main lever 4, and the main tube 7 at a second end 15 is provided with a first attachment means 16 for articulating with the drive strut 6, which is integrated into the outboard tube 9. In an embodiment, said first attachment means 16 is in the form of a lug 12 which protrudes from the main tube 7 in the radial direction thereof. A joint bore 121 is provided on the lug 12 and is aligned with the joint bore 611 on the proximal end 61 of the drive strut 6, and a joint pin 20 can be inserted into the joint bores 121 and 611, so that a hinge joint can be established between the outboard tube 9 and the drive strut 6.

In an embodiment, the outboard tube 9 has substantially the same configuration as the inboard tube 8 and the difference therebetween lies in that the inboard tube 8 is a little longer than the outboard tube 9. The inboard tube 8 and the outboard tube 9 are respectively engaged with the spline hole of the main lever 4.

Figure 5:
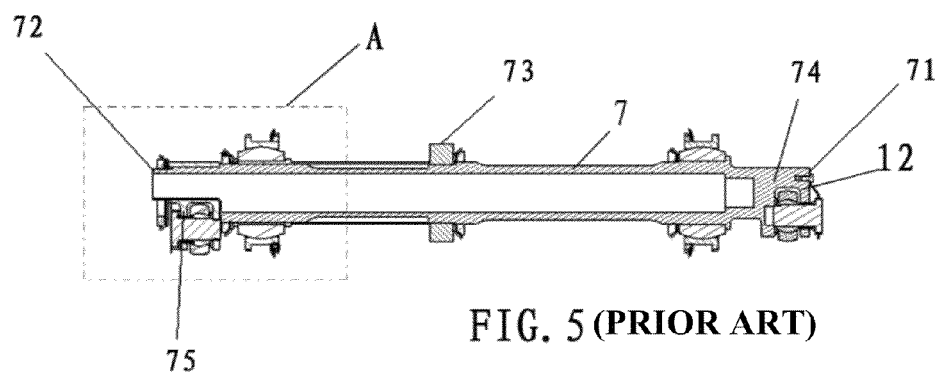
FIG. 5 shows a second embodiment of the main tube of the droop panel linkage.
Figure 6:
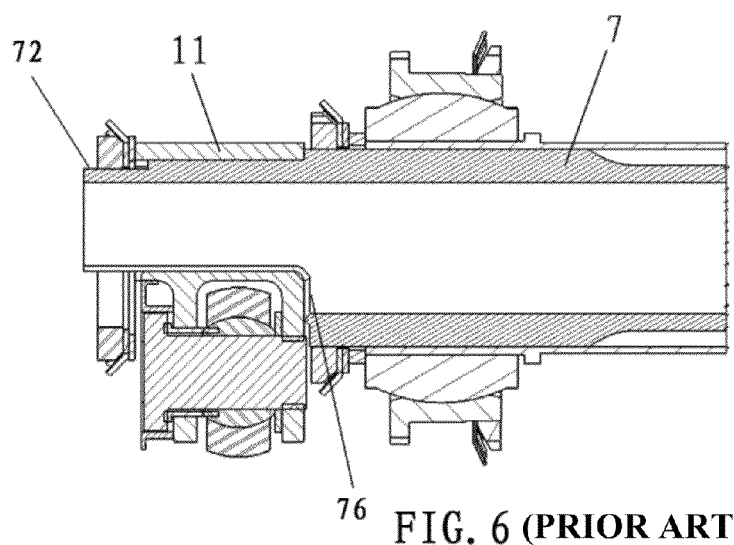
FIG. 6 shows details of A in FIG. 5.

FIG. 5 shows a second embodiment of the main tube of the droop panel linkage 2. The second embodiment differs from the first embodiment as illustrated in FIG. 4 in that the main tube 7 in FIG. 5 is configured as a single piece. The length of the main tube is greater than the distance between two bearings supporting the main tube 7. A second engagement means 73, preferably outer spline teeth, is provided substantially at the centre of the main tube 7, for engaging with a first engagement means 43, preferably inner spline teeth, of the main lever 4. In order to meet requirements of mounting, only the first end 71 of the main tube 7 is provided with a first attachment means 74 for articulating with the drive strut 6, which is integrated with the main tube 7. Preferably, the first attachment means 74 is in the form of a lug 12 which protrudes from the main tube 7 in the radial direction thereof. As shown in the embodiment illustrated in FIG. 6, a second attachment means 75 for articulating with the drive strut 6 is detachably mounted on the second end 72 of the main tube 7. Preferably, the second attachment means 75 is in the form of a cam 11. The cam 11 has a same profile as the lug 12, and the cam 11 and the lug 12 have respectively a joint bore for receiving a joint pin. From the second end 72 of the main tube 7 in the direction parallel to the longitudinal axis thereof, a step or segment 76 is formed on the main tube 7. The second attachment means 75 has a bore which is adapted to the step 76 formed on the main tube 7. Thus, the second attachment means 75 engages with the step 76 formed on the main tube 7 thereby allowing the main tube 7 to actuate the drive strut 6 via the second attachment means 75. In the second alternative embodiment, the first attachment means 74 and the second attachment means 75 are articulated with a drive strut 6 respectively In a third embodiment of a droop panel linkage 2 illustrated in FIG. 7, the main tube 7 is also configured as one unitary piece. The third embodiment as shown in FIG. 7 differs from the second embodiment as shown in FIG. 5 in the connection between the main tube 7 and the second attachment means 75.

Figure 7:
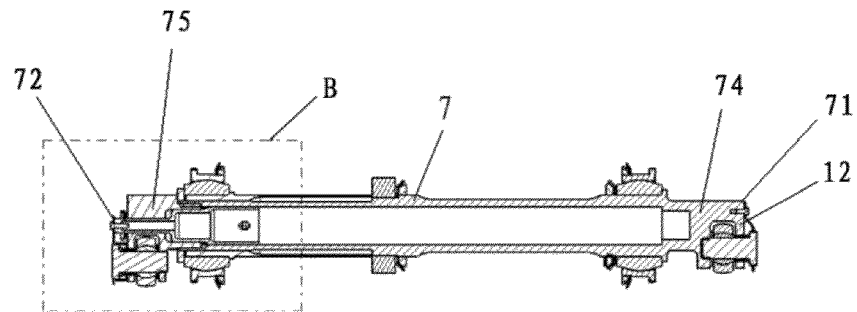
FIG. 7 shows a third embodiment of the main tube of the droop panel linkage.
Figure 8:
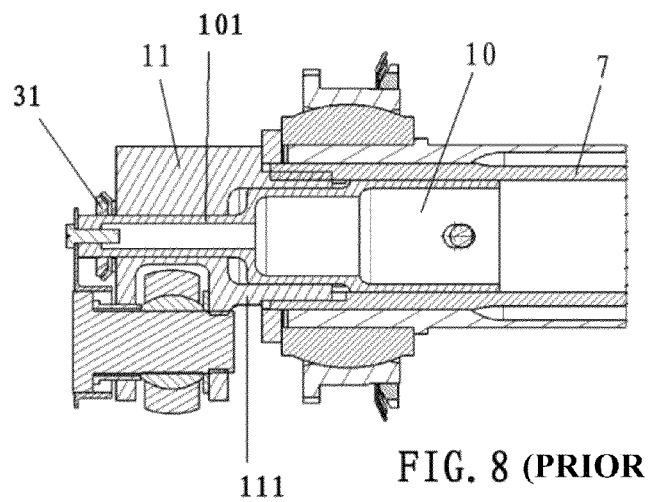
FIG. 8 shows details of B in FIG. 7.

The main tube 7 as shown in FIG. 7 has a configuration similar to the configuration of the main tube 7 as shown in FIG. 5, i.e. an second engagement means, preferably outer spline teeth, is provided substantially at the centre of the main tube 7, and only the first end 71 of the main tube 7 is provided with a first attachment means 74 for articulating with the drive strut 6, which is integrated with the main tube 7. Preferably, said first attachment means 74 is in the form of a lug 12, protruding radially from the main tube. However, here, the second attachment means 75 for articulating the drive strut 6, preferably a cam 11 as shown in FIG. 8, has an axial extension portion 111, which can be inserted into the inner hollow cavity of the main tube 7, whereby an engagement means, such as outer spline teeth, of said axial extension portion 111 engage with an corresponding engagement means, such as inner spline teeth, of the inner hollow cavity of the main tube 7. At the second end 72 of the main tube 7 as shown in FIG. 7, a stepped hollow part 10 can be inserted into the inner hollow cavity of the main tube 7. The hollow part 10 protrudes at its one end having smaller diameter from the central bore of the second attachment means 75, and the second attachment means 75 can be fixed axially by means of a lock nut 31 being screwed on the protruding portion 101 of the hollow part 10.

Although the invention has been described by way of example and with reference to particular embodiments, it is to be understood that modification and/or improvements may be made without departing from the scope of the appended claims.

Where in the foregoing description reference has been made to integers or elements having known equivalents, then such equivalents are herein incorporated as if individually set forth.

LIST OF REFERENCE NUMERALS 1 droop panel
2 droop panel linkage
3 flap
4 main lever
5 lever arm
6 drive strut
7 main tube
8 inboard tube
9 outboard tube
10 hollow part
11 cam
12 lug

The invention claimed is:
1. A droop panel linkage, comprising:
    a lever arm,
    a main lever,
    a main tube,
    and at least one drive strut, said lever arm is pivotally attached at a first end to a flap and is pivotally connected at a second end to a first end of the main lever, wherein a second end of said main lever is provided with a first engagement means for engaging with a second engagement means incorporated into or associated with the main tube, said main tube being pivotally connected at its one end to a proximal end of the drive strut, wherein a distal end of the drive strut is pivotally attached to the droop panel, characterized in that said main lever is configured to be a single-lever type of main lever, characterized in that the main tube is configured to be a single piece, wherein the second engagement means is arranged substantially at the centre of the main tube so as to engage with the first engagement means of the main lever, wherein the main tube has at a first end a first attachment means for articulating with the drive strut, which is integrated with the main tube, wherein a second attachment means for articulating with the drive strut is detachably mounted on the second end of the main tube.

2. A droop panel linkage according to claim 1, characterized in that the main lever engages with the main tube by means of a spline arrangement.

3. A droop panel linkage according to claim 1, characterized in that the first attachment means is in the form of a lug which protrudes from the main tube in the radial direction thereof, and the second attachment means is in the form of a cam, and the cam and the lug have respectively a joint bore for receiving a joint pin.

4. A droop panel linkage according to claim 1, characterized in that from the second end of the main tube in the direction parallel to the axis thereof, a step or a segment is formed on the main tube.

5. A droop panel linkage according to claim 4, characterized in that the second attachment means has a bore which is adapted to the step formed on the main tube, and the second attachment means engages with the step formed on the main tube thereby allowing the main tube to actuate the drive strut via the second attachment means.

6. A droop panel linkage according to claim 1, characterized in that the second attachment means has an axial extension portion which can be inserted into an inner hollow cavity of the main tube, whereby an engagement means of said axial extension portion engages with a corresponding engagement means of the inner hollow cavity of the main tube.

7. A droop panel linkage according to claim 6, characterized in that at the second end of the main tube, a stepped hollow part can be inserted into the inner hollow cavity of the main tube, wherein the hollow part protrudes at its one end having smaller diameter from the central bore of the second attachment means, and the second attachment means can be fixed axially by means of a lock nut being screwed on the protruding portion of the hollow part.

8. A droop panel linkage according to claim 1, characterized in that the second engagement means incorporated into or associated with the main tube is an outer spline teeth.

9. A droop panel linkage according to claim 1, characterized in that the first engagement means of the main lever is an inner spline teeth.

10. A droop panel linkage according to claim 6, characterized in that the engagement means of said axial extension portion is an outer spline teeth.

11. A droop panel linkage according to claim 6, characterized in that the corresponding engagement means is an inner spline teeth.

* * * * *